(12) United States Patent
Hiebl

(10) Patent No.: US 10,319,246 B2
(45) Date of Patent: Jun. 11, 2019

(54) UNMANNED AERIAL VEHICLE AND METHOD FOR SAFELY LANDING AN UNMANNED AERIAL VEHICLE

(71) Applicant: AIRBUS DEFENCE AND SPACE GMBH, Taufkirchen (DE)

(72) Inventor: Manfred Hiebl, Neuburg a. d. Donau (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 97 days.

(21) Appl. No.: 15/280,436

(22) Filed: Sep. 29, 2016

(65) Prior Publication Data

US 2017/0092137 A1    Mar. 30, 2017

(30) Foreign Application Priority Data

Sep. 29, 2015    (DE) .................. 10 2015 012 477

(51) Int. Cl.
 *G05D 1/00* (2006.01)
 *G05D 1/02* (2006.01)
 (Continued)

(52) U.S. Cl.
 CPC ......... *G08G 5/0069* (2013.01); *B64C 39/024* (2013.01); *G01C 21/00* (2013.01);
 (Continued)

(58) Field of Classification Search
 None
 See application file for complete search history.

(56) References Cited

U.S. PATENT DOCUMENTS 6,377,875 B1    4/2002    Schwaerzler
8,798,922 B2 *  8/2014    Tillotson ................ G05D 1/101
                                              701/3

(Continued)

FOREIGN PATENT DOCUMENTS

EP         1657611 A1     5/2006
EP         2853974 A1     4/2015
WO     WO 2013/124852 A1  8/2013

OTHER PUBLICATIONS

German Office Action for DE 10 2015 012 477.3 dated Sep. 6, 2016.
(Continued)

*Primary Examiner* — Thomas G Black
*Assistant Examiner* — Demetra R Smith-Stewart
(74) *Attorney, Agent, or Firm* — Jenkins, Wilson, Taylor & Hunt, P.A.

(57) ABSTRACT

An unmanned aerial vehicle with lift and propulsion system and a flight control system and method. The flight control system has a flight control unit, a navigation system, a communication system and an actuator system. The flight control unit can calculate, based on data from the navigation system and/or data of a ground control station, control commands which can be fed to the actuator system for actuating the lift and propulsion system. The ground control station is configured to control and/or monitor the aerial vehicle. The aerial vehicle has a monitoring unit to monitor the communication system to determine whether all the communication links are interrupted. The monitoring unit can cause the flight control unit to land the aerial vehicle safely at a suitable landing site based on stored data relating to current flight conditions and nearby landing sites.

14 Claims, 4 Drawing Sheets

(51) Int. Cl.
  *G05D 1/10* (2006.01)
  *G08G 5/00* (2006.01)
  *B64C 39/02* (2006.01)
  *G01C 21/00* (2006.01)
  *G08G 5/06* (2006.01)
  *G05D 1/06* (2006.01)
  *H04B 7/155* (2006.01)
  *H04L 29/08* (2006.01)

(52) U.S. Cl.
  CPC ......... *G05D 1/0022* (2013.01); *G05D 1/0676* (2013.01); *G08G 5/003* (2013.01); *G08G 5/0013* (2013.01); *G08G 5/065* (2013.01); *B64C 2201/18* (2013.01); *H04B 7/155* (2013.01); *H04L 67/12* (2013.01)

(56) References Cited

U.S. PATENT DOCUMENTS

| | | | | |
|---|---|---|---|---|
| 9,588,516 B1* | 3/2017 | Gurel | ............... | G05D 1/0033 |
| 2004/0193334 A1* | 9/2004 | Carlsson | ............ | G05D 1/0022 |
| | | | | 701/9 |
| 2007/0129855 A1 | 6/2007 | Coulmeau | | |
| 2008/0154477 A1 | 6/2008 | Yokoi et al. | | |
| 2010/0292874 A1* | 11/2010 | Duggan | ............... | G05D 1/0061 |
| | | | | 701/11 |
| 2015/0153740 A1* | 6/2015 | Ben-Shachar | ....... | G05D 1/0676 |
| | | | | 701/16 |
| 2016/0140851 A1* | 5/2016 | Levy | .................... | G08G 5/0069 |
| | | | | 701/3 |
| 2016/0378121 A1* | 12/2016 | Shue | ..................... | G05D 1/105 |
| | | | | 701/7 |
| 2017/0069214 A1* | 3/2017 | Dupray | ............... | G08G 5/0021 |
| 2017/0300065 A1* | 10/2017 | Douglas | ............... | G05D 1/0676 |
| 2017/0358217 A1* | 12/2017 | Priest | ................... | G08G 5/0043 |

OTHER PUBLICATIONS

Extended European Search Report for Application No. 16002043 dated Jan. 25, 2017.

* cited by examiner

UNMANNED AERIAL VEHICLE AND METHOD FOR SAFELY LANDING AN UNMANNED AERIAL VEHICLE

CROSS-REFERENCE TO RELATED APPLICATION

This application claims priority to German Patent Application DE 10 2015 012 477.3 filed Sep. 29, 2015, the entire disclosure of which is incorporated by reference herein.

TECHNICAL FIELD

Various embodiments relate generally to an unmanned aerial vehicle, to a method for safely landing an unmanned aerial vehicle and to a ground control station for controlling and/or monitoring at least one unmanned aerial vehicle.

BACKGROUND

When a data link fails, an unmanned aerial vehicle can either partially or not at all be addressed and controlled any more. In this flight state aerial vehicle is as it were in an "autonomous" mode in which it is completely left to its own devices. In manned aircraft, automatic landing methods are known according to which once an aircraft pilot has initiated the automatic approach procedure, the pilot no longer has to intervene in the landing approach personally. In this context, the aircraft pilot generally has an existing voice radio link to the air traffic control system and cooperates therewith. If, in contrast, the voice radio link has failed, the vehicle in a control zone nevertheless still appears on the radar screens and the pilot can draw attention to his or her position by visual signs (rocking to and fro around the rolling axis) or by light signals to the tower. A manned aircraft cooperates insofar as it can communicate its intention to carry out a safety landing and as a result priority can be assigned by the air traffic controllers. However, an unmanned aerial vehicle which experiences an irreversible data link failure anywhere on its mission only indicates indirectly that it can no longer be commanded, since it no longer reacts to commands but it cannot communicate its intentions in terms of when and where it plans to land to the air traffic control location. It therefore behaves in a classically uncooperative fashion.

SUMMARY

Taking the above as a starting point, an object of the disclosure herein is to disclose an improved unmanned aerial vehicle and related method.

This object is achieved with a device having the features disclosed herein. Exemplary embodiments are also disclosed. Reference is made to the fact that the features of the exemplary embodiments of the devices also apply to embodiments of the method, and vice versa.

An unmanned aerial vehicle which has a lift and propulsion system as well as a flight control system is disclosed. The flight control system has a flight control unit, a navigation system, a communication system and an actuator system. The flight control unit is provided for calculating, based on data from the navigation system and/or data of a ground control station, control commands which can be fed to the actuator system for actuating the lift and propulsion system. The ground control station is configured to control and/or monitor the aerial vehicle. Furthermore, the aerial vehicle has a monitoring unit. The monitoring unit is configured to monitor the communication system in order to determine whether all the communication links of a multiplicity of communication links between the aerial vehicle and the ground control station are interrupted. The monitoring unit is also provided to cause, if an interruption is determined in the communication from the aerial vehicle to the ground control station, the flight control unit to land the aerial vehicle safely at a suitable landing site based on stored data relating to current flight conditions and nearby landing sites.

The term unmanned aerial vehicle can also be understood to refer to a classic manned aircraft which in the event of failure of the aircraft pilot is at least temporarily "unmanned" or without human control.

The communication link can be, for example, a command-and-control data link between the unmanned aerial vehicle (RPAS—Remotely Piloted Aircraft System) and the ground control station (RPAS Controller).

The disclosure herein is based on the concept that an unmanned aerial vehicle can be landed safely in that, in the event of failure of the communication link to the ground control station controlling the aerial vehicle, the aerial vehicle is independently capable of selecting, based on a series of available information items and as a function of the current wind conditions and weather conditions, a suitable nearby landing site from a list of available landing sites and of landing the aerial vehicle in accordance with the local regulations of the selected landing site. In this context, the suitable landing site is selected according to predefined rules, with the result that the responsible air traffic control center closes the airspace which is to be passed through for the landing and closes the suitable landing site. Since the rules according to which the suitable landing site is selected by the aerial vehicle are known to the air traffic control center, given the presence of an identical data basis, the air traffic control center arrives at the same suitable landing site and can selectively close, without exchanging data with the unmanned aerial vehicle, the corresponding airspace and landing site for the passage or landing of the unmanned aerial vehicle. Therefore, an agreed cooperative landing procedure in the event of an irreversible interruption in the data link is available between the aircraft manufacturer of the unmanned aerial vehicle or the operator of the unmanned aerial vehicle and the flight safety authorities.

By virtue of the aerial vehicle described herein it is possible, in the event of an irreversible failure of a data link, to act as quickly as possible and to fly immediately to an alternative airfield. In the event of an irreversible failure of a data link, every extra minute which the aircraft spends in the air is significant, since its unpredictability is increased and the authorities which are responsible for flying safety can therefore experience increasingly serious emergencies.

In the event of a failure of the data link, legal agreements about the expected flying behavior can be made in advance between the manufacturer and legislators so that the latter are spared surprises in terms of the traffic safety of the aerial vehicle, and the legally agreed cooperation between the air transportation vehicle and the regulatory authorities can be ensured.

The aerial vehicle which is described herein constitutes a cooperative system with respect to possible airworthiness certification.

The term "nearby" denotes an area surrounding the current position of the aerial vehicle which can still be reached with the available energy resources of the aerial vehicle but is preferably as close as possible.

According to one preferred embodiment, the navigation system has a memory. At least nearby landing sites and the current wind data and weather data relating to the immediate surroundings of the aerial vehicle and the nearby landing sites are stored in the memory. In order to update the navigation system and the stored landing sites, for example an extract from a complete database of available landing sites can be loaded, for example before the unmanned aerial vehicle takes off, or the data can be successively subsequently loaded during the flight for at least part of the section of the flight via, for example, a communication link with the ground control station. In addition to the current geographic coordinates of the landing site, further information about the landing site can also be included such as, for example, local no-fly zones, geographic key points of airfield traffic patterns, landing thresholds, local navigation aids or further data. A database in which alternative airfields with precise geographic information about starting thresholds and landing thresholds and suitable navigation aids is stored in the flying segment.

This has the advantage that the unmanned aerial vehicle has a list of the at least nearby landing sites available at any time. A further advantage is that as a result safe landing counter to the wind is possible and safe avoidance maneuvers are made possible in the event of significant weather phenomena.

The term "memory" relates here essentially to any type of memory which can receive and store data. The memory generally coincides to a memory which can be used e.g. by a computer processor or in a computer system. In particular, memory relates here by definition to any type of memory on which data can be written and read during the operation of a computer which uses the memory. The memory can comprise e.g. a direct access memory (Random Access Memory or RAM). The RAM can be e.g. a static RAM (SRAM). Other types of memory comprise, without being limited thereto, a dynamic direct access memory (Dynamic Random Access Memory or DRAM) and various designs of memory which are based on latches, flip-flops and other bistable structures (e.g. memristors).

According to one preferred embodiment the flight control unit is also provided for selecting a suitable landing site based on the stored wind data and weather data of nearby landing sites at an expected arrival time at the landing site. The selection of the suitable landing site is carried out according to defined rules. So that the selection of the suitable landing site can also be carried out in parallel by a ground control station, the rules according to which the aerial vehicle selects a suitable landing site are defined in advance. To be more precise, the selection criteria according to which the selection of the suitable landing site is carried out are known both to the aerial vehicle and also to the responsible air traffic control center, with the result that the aerial vehicle and the air traffic control center determine the identical landing site as a suitable landing site as a function of, for example, the last position of the aerial vehicle when the communication links are broken off and as a function of, for example, the given weather conditions of the closest landing sites. As a result, the air traffic control center is able to order the execution of, or carry out itself, all the necessary measures in situ, i.e. at the selected landing site, with the result that safe landing of the aerial vehicle can be made possible. For this purpose, it may be necessary, for example, for the ground control station to close, at least temporarily, the airspace at the suitable selected landing site or the selected runway for the landing of the aerial vehicle.

As a result, essentially autonomous on-board route planning is carried out which prevents landing under meteorological unfavorable (significant) weather conditions and diverts the aerial vehicle to another alternative airfield.

According to one preferred embodiment, the flight control unit is also provided for determining a flight route to the selected landing site, wherein the determination of the flight route is carried out according to defined rules. The flight route to the selected landing site is preferably selected or defined over the shortest possible distance, i.e. the flight control unit will direct the aircraft as far as possible to the closest landing site which is suitable for the landing depending on the weather conditions prevailing at the location. This has the advantage that the determination of the flight route is carried out according to clear rules and the flight control on the ground can at least temporarily close, in accordance with these rules, the airspace or the landing site for the landing of the aircraft.

The term "rules" refers here essentially to instructions which are applied by the air traffic control system and by the flight control unit and according to which the decision regarding the selection of a suitable landing site is made. For example, the rules can comprise the fact that the aircraft is guided, for example from the current position, directly to the airfield traffic pattern of the selected landing site, for example using the data of a database with information about, for example, prohibited areas in the immediate surroundings of the aircraft and about available landing sites and the available wind data and weather data for the selected landing site.

In accordance with the determination of the flight route, the suitable landing threshold is detected based on the wind direction, and during the landing approach the corresponding lead angle is determined in such a way that the expected arrival time at the landing site can be calculated therefrom.

At the time at which the monitoring unit detects an irreversible failure of the data link between the aerial vehicle and the ground control station, the current position data and speed data are stored and the kinematic movement variables are preferably frozen while the course over ground and the flying speed of the aerial vehicle are temporarily maintained.

So that the unmanned aerial vehicle can determine the flight route to a suitable landing site, the aerial vehicle carries a valid database extract, for example for its mission area, in which extract the nearby alternative airfields or landing sites are stored with information on the geographic coordinates of the airfield, the starting threshold and landing threshold and of distinct objects in terms of finding bearings in the grounds of the airfield or in the area surrounding the grounds.

The unmanned aerial vehicle can access the current weather data applicable to its mission area and stored, for example, in a writable memory, in particular the airfield weather data contained therein for the alternative airfield, and can extract therefrom not only significant weather phenomena, but also, in particular, the wind direction and wind strength present at the landing site at the expected arrival time.

According to one preferred embodiment, the determination of the flight route is carried out by compound navigation. Alternatively, the determination of the flight route can also be carried out by Doppler navigation or inertial navigation. In the case of compound navigation, the unmanned aerial vehicle can carry out the navigation from the last known position to the selected suitable landing site. This has the advantage that for short time periods in which the aerial vehicle should generally have landed, the most precise possible navigation is possible.

The reaction of the aerial vehicle which is to be expected according to air traffic law (cooperative system), in particular the selection of the suitable alternative airfield, may have been previously communicated, for example in a legally binding form, between the aircraft manufacturer and the air traffic control system so that the air traffic control system also knows the reactions of the aircraft and can be prepared for them.

After this, for example according to the procedures agreed in legally binding form between the vehicle manufacturer and the German air traffic control authority or the like, the unmanned aerial vehicle must go, for example, into the "compound navigation" operating mode and define the flight route autonomously based on its recently frozen flight data, which also cooperatively integrates the air traffic control location into the intended flight path.

This has the advantage that the reactions of the unmanned aerial vehicle are therefore uniquely defined based on specific agreements or legal regulations and are disclosed in a traceable fashion.

According to one preferred embodiment, the determined flight route can be corrected continuously by taking regular cross bearings with respect to stored local destinations. The cross bearings are preferably taken by trigonometric calculation using the GPS positions. In the case of any triangulation, it is advantageous that the measurement is carried out as early as possible in order to increase the accuracy. This should preferably be taken into account for the selection of suitable bearing-taking objectives. This has the advantage that procedural errors can be minimized by actively correcting the navigation variables subsequently.

The determination of the instantaneous flying altitude of the aerial vehicle above ground can be carried out, for example, by a laser altimeter or radar altimeter. These altitude data can be made available to the flight control unit in order to be able to transmit altitude corrections to the lift and propulsion system.

According to one preferred embodiment, changes in direction and/or course are carried out by defined standard curves at the locations defined by an airfield traffic pattern at the selected landing site. If the unmanned aerial vehicle flies, for example, into the airfield traffic pattern, it is advantageous if the unmanned aerial vehicle "rides" on the bearing-determining beam and does not approach in what is referred to as a dog curve. The bearing-determining beam is a straight line through two key points of the airfield traffic pattern. For the unmanned aerial vehicle to meet the bearing-determining beam it is advantageous if the cross bearing converges toward zero in the azimuth. The cross track error preferably has to be subsequently minimized by the automatic flight control. When making a blind approach to the runway this is preferably advantageous in order to permit a central touchdown in a wind-dependent oblique approach. The ground coordinates of the landing threshold are preferably of interest for the vertical descending movement. If the ground coordinates of the landing threshold are not known, the unmanned aerial vehicle can land, but under certain circumstances when it lands the touchdown is somewhat harder.

In addition to the azimuthal cross bearing, the vertical alignment bearing is significant for approaching and minimizing the lateral drift as a result of wind. The bearing of the more remote key point of the airfield traffic pattern is determined here by the closer one (computationally). By minimizing this alignment bearing, the approaching UAV moves precisely to the specified setpoint height of the airfield traffic pattern and can initiate from there the safe descent.

According to one preferred embodiment, the flight control unit is also provided for determining a suitable landing threshold of the at least two possible landing thresholds of the selected landing site. A landing threshold (THR) normally characterizes the start of the runway on an airfield. It is marked as a transverse bar in a white color. This has the advantage that the landing of the unmanned aerial vehicle can take place in the region of the runway which is provided for it, and a sufficiently long runway is still available for the aerial vehicle to taxi to a standstill.

According to one preferred embodiment, the flight control system also has a distance-measuring device. The distance-measuring device is configured to determine regularly the distance from the runway during landing approach, in order to correct the determined flight route in the case of deviations. The distance measurement can be carried out, for example, based on significant objects in the region of the runway or of the immediate surroundings of the landing site. Such significant objects can be made available to the navigation system of the unmanned aerial vehicle by virtue of their geographic coordinates, for example. The actual distance measurement can be carried out, for example, by a laser or the like. This has the advantage that the accuracy for the landing of the unmanned aerial vehicle can be increased.

According to one preferred embodiment, the flight control unit is also provided for safely landing the aerial vehicle by taking regular cross bearings by GNSS (Global Navigation Satellite System) measurements with respect to stored objects at the selected landing site. In this context it is assumed that the GNSS system of the aircraft is still functionally capable. The aerial vehicle preferably has multiply redundant GNSS systems, with the result that even in the event of a failure of a GNSS system one or even two standby GNSS systems are available. This has the advantage that the accuracy for the landing of the unmanned aerial vehicle can be increased.

The aerial vehicle can continuously correct its route, defined at the beginning by compound navigation, by regular distance measurements from the runway and deviations from the course line by cross bearings with respect to known targets which are also stored in the database, until the precise touchdown has taken place at the selected landing threshold and the aerial vehicle can safely taxi to a standstill. Changes in direction and course can take place, for example, at the locations prescribed by the airfield traffic pattern and can follow standard curves which are, for example, bindingly agreed in the "compound navigation" operating mode.

According to one preferred embodiment, the flight control unit is also provided for directing the aerial vehicle to a safe parking position after landing has taken place at the selected landing site, based on stored information about the local conditions. Data relating to local conditions such as, for example, the starting runways/landing runways, taxiing ways, run-up and further air-side installations of the selected landing field are preferably stored in the memory to which the flight control unit of the unmanned aerial vehicle has access. Based on this information, the unmanned aerial vehicle can taxi to a safe parking location insofar as this is possible under its own power. Alternatively, the unmanned aerial vehicle can be brought to a safe storage location with external help. This has the advantage that the landing site can become free again for the normal flight traffic as soon as the unmanned aerial vehicle has reached a safe storage location or as soon as it has left the runway.

Furthermore, a method for safely landing an unmanned aerial vehicle is disclosed. The method has the step of determining whether all the communication links of a multiplicity of communication links between the aerial vehicle and a ground control station, configured for controlling and/or monitoring the aerial vehicle, are interrupted. Furthermore, the method has the step of landing the aerial vehicle at a suitable landing site based on stored data relating to the current flight conditions and nearby landing sites if an interruption is determined in the communication link between the aerial vehicle and the ground control station.

According to one preferred embodiment, the method also has the step: determining by the ground control station whether all the communication links of the multiplicity of communication links between the aerial vehicle and the ground control station are interrupted, and transmitting the information about the interruption to an air traffic control center.

According to one preferred embodiment, the air traffic control center closes at least part of an available airspace and a suitable landing site for safe landing of the aerial vehicle. The aerial vehicle selects the identical suitable landing site for landing, in accordance with the rules defined by the air traffic control center.

Furthermore, a ground control station for controlling and/or monitoring at least one unmanned aerial vehicle is disclosed. The ground control station has a communication system, configured for communicating with the unmanned aerial vehicle and for communicating with an air traffic control system, having a multiplicity of communication links. The ground control station also has a monitoring device, configured for monitoring the multiplicity of communication links of the ground control station with the aerial vehicle and the air traffic control system. If the monitoring device detects that all the communication links of the multiplicity of communication links between the ground control station and the aerial vehicle are interrupted, information about the navigation data and characteristic data of the aerial vehicle is transmitted to the air traffic control system.

The communication link between the ground control station and the air traffic control system or air traffic control location can be, for example, a digital communication link or an analog communication link.

By transmitting the failure of the communication links with the unmanned aerial vehicle to the air traffic control system, it is therefore possible to automatically trigger, in the event of the occurrence of an irreversible failure of a data link, an immediate prior warning about the risk to other traffic participants posed by a non-cooperative aerial vehicle. At the time of an irreversible and complete failure of a data link, a message is sent from the ground control station to the air traffic control system, explaining the failure of the data link and communicating the last valid navigation data and characteristic data.

The air traffic control location can subsequently temporarily close the airspace in the control zone to other aerial vehicles and must grant preferred landing to the unmanned aerial vehicle.

According to the current status of air traffic regulations, the initiation of the landing approach of an unmanned aerial vehicle without approval by the air traffic control location should generally not be carried out autonomously. In the event of an irreversible failure of a data link, the method which is described herein should therefore be agreed correspondingly in advance with the air traffic control location at least at the current time. If failure of the communication link (data link) with the ground station occurs, after, for example, an instrument landing system (ILS) has already been activated, that is to say if the unmanned aerial vehicle has already been granted landing approval by the air traffic control system, the described system is initially redundant, especially since it is a matter of an anticipated landing procedure which no longer needs to be aborted. The method described in this disclosure herein serves preferably for landing on alternative airfields and runways which do not have an ILS as well as in cases in which the ILS has not yet been activated.

A case in which two or more aerial vehicles are affected simultaneously by the failure of the data link, i.e. the failure of all the communication links between the unmanned aerial vehicle and the ground station, is very improbable. According to the method described herein, the closing of the airspace would take place without delay after the confirmation of the failure of the data link of the first aircraft which has reported it, with the result that the second UAV which is affected e.g. one second later, would no longer be allowed to land on this airfield, or at any rate not with priority, before the first UAV has landed and the closure of the airspace has been lifted. The second unmanned aerial vehicle could, for example, postpone its landing until the runway was cleared again. Insofar as the failure of the data link does not actually occur exactly simultaneously, further unmanned aerial vehicles would, however, already have received the message about the closure of the airspace at this time. This could occur, for example, by virtue of the fact that when there are multiply redundant data links information about the closure of the airspace and permission to land could be exchanged when the last but one communication link fails (as a rule all of the links should not be able to fail at precisely the same time) or even earlier, that is to say the information could still be imparted to the other party in the collision in good time. Consequently, it would always be possible to have recourse, for example, to position data of the other party in the collision by exchanging GPS data and a procedure which is compatible with avoidance rules could be applied. Multiple total data link failure would consequently be very improbable, and the behavior according to the previously agreed rules could ensure, for example, the air safety within the scope of the specification of the frequency of failure.

BRIEF DESCRIPTION OF THE DRAWINGS

In the drawings, generally identical reference numbers relate to the same parts over the various views. The drawings are not necessarily true to scale; value is instead generally placed on the illustration of the principles of the disclosure herein. In the following description, various embodiments of the disclosure herein are described with reference to the following drawings in which.

DETAILED DESCRIPTION

Figure 1A:
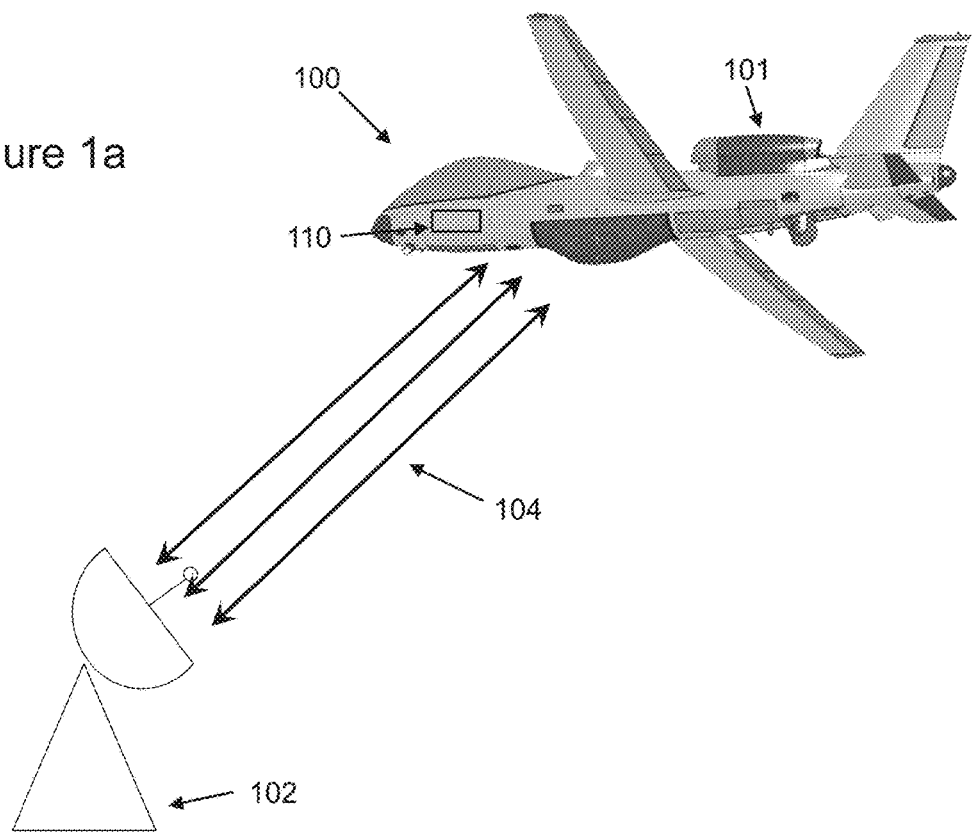
FIGS. 1a and 1b illustrate a first embodiment of an unmanned aerial vehicle and of a flight control system.

The following detailed description refers to the appended drawings which show, for the sake of explanation, specific details and embodiments in which the disclosure herein can be implemented.

The word "for example" is used herein with the meaning "serving as an example, case or illustration". Each embodiment or configuration which is described here as "for example" is not necessarily to be interpreted as being preferred or advantageous compared to other embodiments or refinements.

In the following detailed description, reference is made to the appended drawings which form part of this description and in which, for the purpose of illustration, specific embodiments are shown in which the disclosure herein can be practiced. In this regard, direction terminology such as "above", "below", "at the front", "at the rear", "front", "rear", etc. is used with respect to the orientation of the described figure or figures. Since components of embodiments can be positioned in a number of different orientations, the direction terminology serves for the purpose of illustration and is in no way restrictive. It is to be understood that other embodiments can be used and structural or logical modifications can be made without departing from the scope of protection of the present disclosure. It is to be understood that the features of the various exemplary embodiments described herein can be combined with one another unless specifically stated otherwise. The following detailed description is therefore not to be interpreted in a restrictive sense and the scope of protection of the present disclosure is defined by the appended claims.

Within the scope of this description, the terms "connected" and "coupled" are used for describing both a direct connection and an indirect connection, and a direct or indirect coupling. In the figures, identical or similar elements are provided with identical reference numbers insofar as this is expedient.

In the methods described here, the steps can be carried out in virtually any desired sequence without departing from the principles of the disclosure herein unless a chronological or functional sequence is expressly specified. If it is stated in a patent claim that a step is carried out first and then a plurality of other steps are carried out subsequently, this is to be understood as meaning that the first step is carried out before all other steps but the other steps can be carried out in any desired suitable sequence unless a sequence is presented within the other steps. Parts of claims in which, for example, "step A, step B, step C, step D and step E" are specified are thus to be understood as meaning that step A is carried out first, step E is carried out last and steps B, C and D can be carried out in any desired sequence between steps A and E, and that the sequence is covered by the formulated scope of protection of the claimed method. Furthermore, disclosed steps can be carried out simultaneously unless an express formulation in the claim states that it is to be carried out separately.

For example, a step for carrying out X in the claim and a step for carrying out Y in the claim can be carried out simultaneously within a single operation and the resulting process is covered by the formulated scope of protection of the claimed method.

Figure 1B:
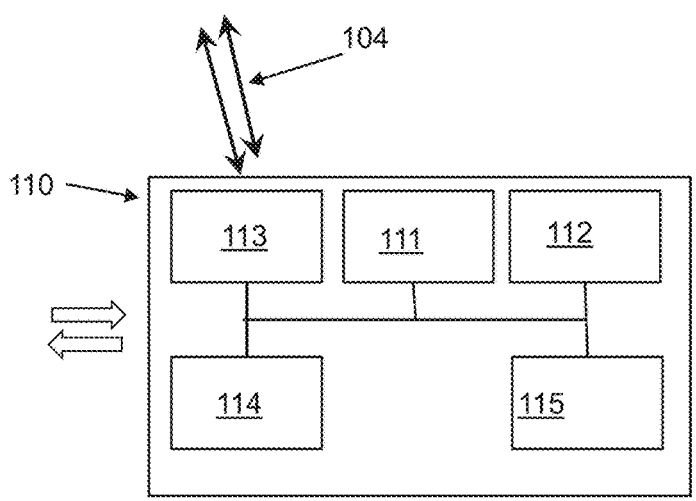

FIGS. 1a and 1b illustrate a first embodiment of an unmanned aerial vehicle 100 and of a flight control system 110.

FIG. 1a illustrates an embodiment of an unmanned aerial vehicle 100 and a ground control station 102. The ground control station 102 is configured to control and/or monitor the aerial vehicle 100. In order to control and/or monitor the aerial vehicle 100 there are a multiplicity of communication links 104 between the ground control station 102 and the aerial vehicle 100.

The unmanned aerial vehicle 100 has a lift and propulsion system 101 and a flight control system 110. The flight control system 110 has a flight control unit 111, a navigation system 112, a communication system 113 and an actuator system 114. The flight control system 110 is illustrated in further detail in FIG. 1b.

The flight control unit 111 of the flight control system 110 is provided to calculate, based on data from the navigation system 112 and/or data of a ground control station 102, control commands which are fed to the actuator system 114. The actuator system 114 uses the control commands to actuate the lift and propulsion system 101 of the aerial vehicle 100.

The flight control system 110 also has a monitoring unit 115. The monitoring unit 115 is configured to monitor the communication system 113. In this context, the monitoring unit 115 determines whether all the communication links 104 of a multiplicity of communication links 104 between the aerial vehicle 100 and the ground control station 102 are interrupted. The monitoring unit 115 is also provided to cause, if an interruption is determined in the communication 104 from the aerial vehicle 100 to the ground control station 102, the flight control unit 111 to land the aerial vehicle 100 safely at a suitable landing site based on stored data relating to current flight conditions and nearby landing sites.

FIG. 1b illustrates an embodiment of a flight control system 110. The flight control system 110 has a flight control unit 111, a navigation system 112, a communication system 113, an actuator system 114 and a monitoring unit 115. The flight control unit 111, the navigation system 112, the communication system 113, the actuator system 114 and the monitoring unit 115 are connected to one another by electric leads or connected to one another via a bus system (not illustrated). The flight control unit 111 is provided to calculate, based on data from the navigation system 112 and/or data of a ground control station 102, control commands which are fed to the actuator system 114. The actuator system 114 uses the control commands to actuate the lift and propulsion system 101 of the aerial vehicle 100. The navigation system 112 receives, for example, GNSS data for determining the position of the aerial vehicle 100. By the communication system 113, the aerial vehicle 100 communicates with the ground control station 102 via a multiplicity of communication links 104.

Although the flight control system in FIGS. 1a and 1b is illustrated only in a simple embodiment, parts of the flight control system or the entire flight control system can also be present redundantly in the aerial vehicle. In this context, a decision unit (not illustrated) can be present which makes decisions according to predefined rules based on the redundantly present results from the multiply present units. Such decision units are known in aviation.

Figure 2:
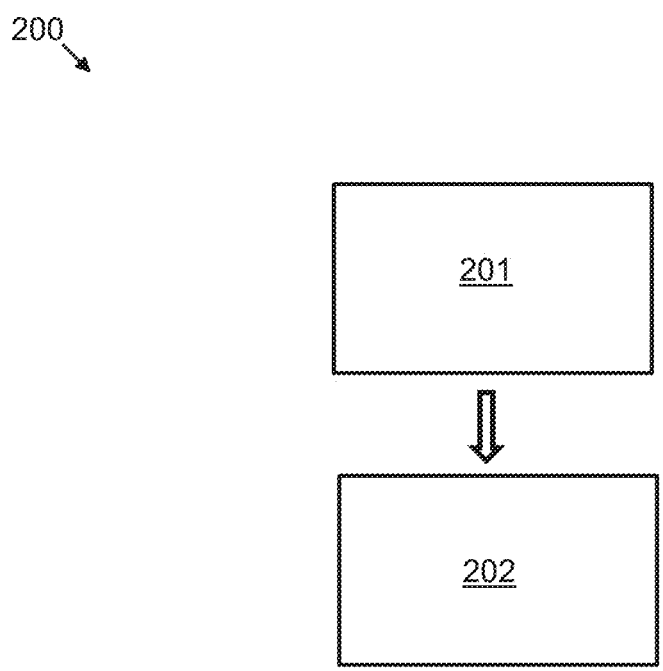
FIG. 2 is a flowchart of an embodiment of a method for safely landing an unmanned aerial vehicle.

FIG. 2 is a flowchart 200 of an embodiment of a method for safely landing an unmanned aerial vehicle.

In step 201 of the method it is determined whether all the communication links of a multiplicity of communication links between the aerial vehicle and a ground control station, configured to control and/or monitor the aerial vehicle, are interrupted. In step 202, when an interruption is determined in the communication link between the aerial vehicle and the ground control station, the aerial vehicle is landed at a suitable landing site based on stored data relating to the current flight conditions and nearby landing sites.

Figure 3:
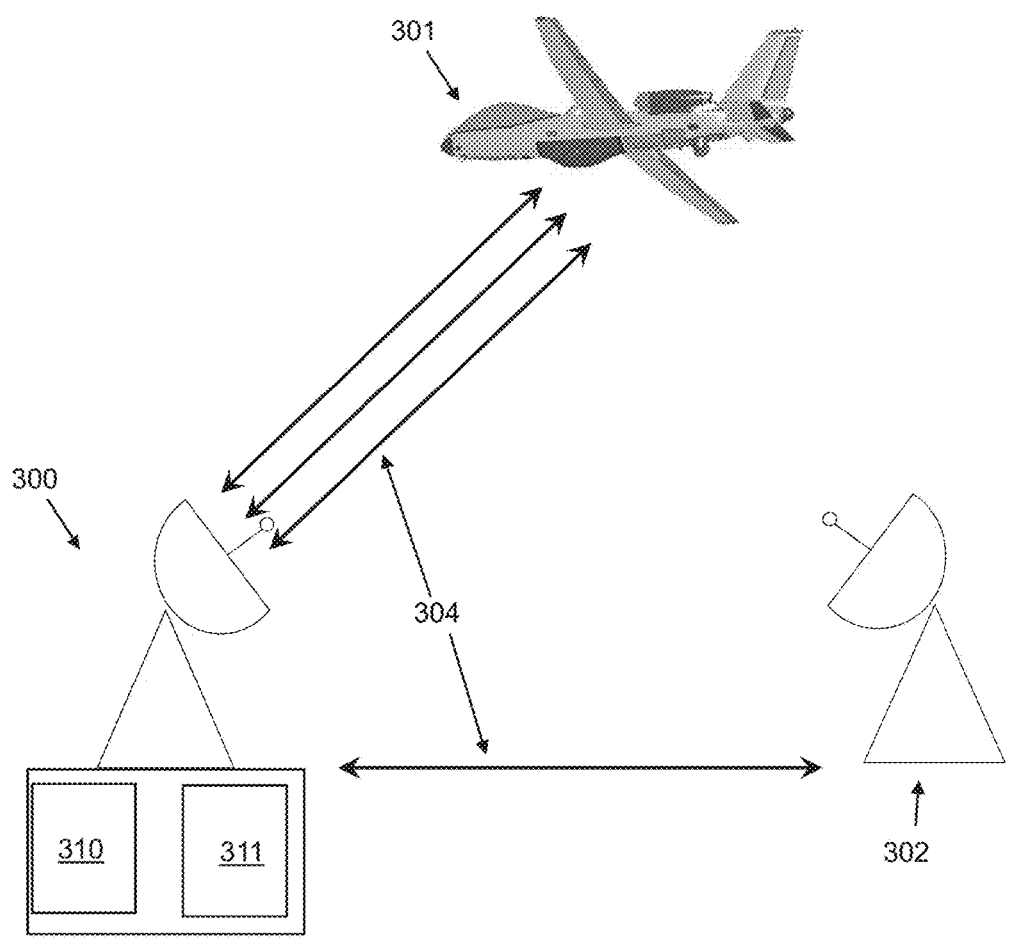
FIG. 3 illustrates an embodiment of a ground control station for controlling and/or monitoring at least one unmanned aerial vehicle.

FIG. 3 illustrates a ground control station 300 for controlling and/or monitoring at least one unmanned aerial vehicle 301. The ground control station 300 has a communication system 310. The communication system 310 is configured to communicate with the unmanned aerial vehicle 301 and to communicate with an air traffic control system 302. For this purpose, the communication has a multiplicity of communication links 304 at least between the ground control station 300 and the unmanned aerial vehicle 301. The ground control station 304 also has a monitoring device 311. The monitoring device 311 is configured to monitor the multiplicity of communication links 304 of the ground control station 300 with the aerial vehicle 301 and the air traffic control system 302. If the monitoring device 311 detects that all the communication links 304 of the multiplicity of communication links 304 between the ground control station 300 and the aerial vehicle 301 are interrupted, information about the current navigation data and the characteristic data of the aerial vehicle 301 is transmitted to the air traffic control system 302.

Figure 4:
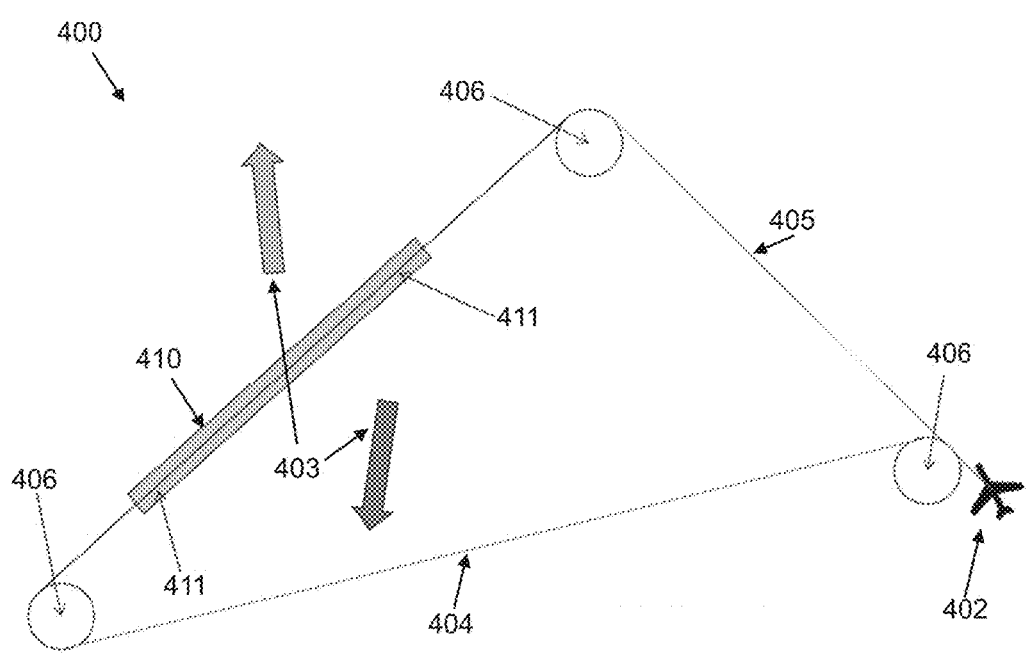
FIG. 4 illustrates possible flight routes for landing an unmanned aerial vehicle.

FIG. 4 illustrates a sketch 400 of possible flight routes for safely landing an unmanned aerial vehicle 402 on a landing site 410. Depending on the wind direction 403, the unmanned aerial vehicle 402 determines an approach route 404, 405 corresponding to the locally predefined airfield traffic pattern. Depending on the wind direction, the flight control system of the unmanned aerial vehicle detects, in the event of failure of all the communication links, the corresponding landing threshold based on the available geographic and meteorological information. For example, in the event of a northerly wind direction 403 the aerial vehicle 402 selects a flight route 404 which permits the aerial vehicle to touch down on the landing threshold 411 of the runway 410 at the correct approach angle by two standard curves 406. Given a southerly wind direction 403, the flight route 405 which permits the aerial vehicle 402 to touch down on the opposite landing threshold 411 of the runway 410 by a standard curve 406 is selected for example. The location and time of the failure of all the communication links between the aerial vehicle 402 and the ground control station (not illustrated) can be, for example, at the illustrated number for the aerial vehicle 402 in the embodiment illustrated in FIG. 4. If the failure occurs at a location or at a time at which the aerial vehicle 402 is still further away from the closest suitable landing site, the aerial vehicle is correspondingly made to approach the airfield traffic pattern of the landing site in accordance with the planning of the flight route.

Although the disclosure herein has been presented and described in particular with reference to specific embodiments, people who are familiar with the specialist field should be aware of the fact that numerous modifications in terms of configuration and details can be made thereto without departing from the essence and scope of the disclosure herein as defined by the appended claims. The scope of the disclosure herein is therefore determined by the appended claims and it is therefore intended that all the modifications which are covered by the literal meaning or the area of equivalence of the claims are included.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

100 Unmanned aerial vehicle
101 Lift and propulsion system
102 Ground control station
110 Flight control system
111 Flight control unit
112 Navigation system
113 Communication system
114 Actuator system
115 Monitoring unit
116 Memory
200 Method
201-202 Steps of the method
300 Ground control station
301 Aerial vehicle
302 Air traffic control system
304 Communication link
310 Communication system
311 Monitoring device

The invention claimed is:

1. An unmanned aerial vehicle, comprising:
a lift and propulsion system; and
a flight control system with:
a flight control unit;
a navigation system;
a communication system; and
an actuator system;
wherein the flight control unit is configured for calculating, based on data from the navigation system and/or data of a ground control station configured to control and/or monitor the aerial vehicle, control commands and supplying the control commands to the actuator system for actuating the lift and propulsion system;
further comprising a monitoring unit configured to monitor the communication system to determine whether all communication links of a multiplicity of communication links between the aerial vehicle and the ground control station are interrupted; and
wherein the monitoring unit is configured to select, in response to determining an interruption on all communication links of the multiplicity of communication links, a suitable landing site based on stored data and in accordance with defined rules for landing site selection, wherein the stored data includes current flight conditions data and nearby landing sites data, and wherein the stored data and the defined rules for landing site selection are mirrored on the ground control station, and wherein the monitoring unit is configured to cause the flight control unit to land the aerial vehicle safely at the selected landing site, and wherein the flight control unit is configured for determining a flight route to the selected landing site, wherein determination of the flight route is carried out according to defined rules for flight route determination, and wherein the defined rules for flight route determination are mirrored on the ground control station with the stored data and the defined rules for landing site selection and the ground control station is configured determine the same flight route and the same selected landing site as determined by the unmanned aerial vehicle in response to determining an interruption on all communication links of the multiplicity of communication links.

2. The unmanned aerial vehicle as claimed in claim 1, wherein the navigation system has a memory in which at least the nearby landing sites data and current wind data and weather data relating to the immediate surroundings of the aerial vehicle and the nearby landing sites are stored.

3. The unmanned aerial vehicle as claimed in claim 2, wherein the flight control unit is also configured for determining, for each nearby landing site of a plurality of nearby landing sites, an expected arrival time at the nearby landing site and weather data for the nearby landing site at the expected arrival time, and the flight control unit is configured for selecting a suitable landing site from the nearby landing sites based on the weather data determined for each expected arrival time at each nearby landing site.

4. The unmanned aerial vehicle as claimed in claim 3, wherein the flight control unit is configured for determining a suitable landing threshold of the at least two possible landing thresholds of the selected landing site.

5. The unmanned aerial vehicle as claimed in claim 3, wherein the flight control system also has a distance-measuring device configured to determine regularly a distance from a runway during landing approach, in order to correct the determined flight route in case of deviations.

6. The unmanned aerial vehicle as claimed in claim 3, wherein the flight control unit is also provided for safely landing the aerial vehicle by taking regular cross bearings by GNSS measurements with respect to stored objects at the selected landing site.

7. The unmanned aerial vehicle as claimed in claim 3, wherein the flight control unit is also provided for directing the aerial vehicle to a safe parking position after landing has taken place at the selected landing site, based on stored information about the local conditions.

8. The unmanned aerial vehicle as claimed in claim 1, wherein the determination of the flight route is carried out by compound navigation.

9. The unmanned aerial vehicle as claimed in claim 8, wherein the determined flight route can be corrected continuously by taking regular cross bearings with respect to stored local destinations.

10. The unmanned aerial vehicle as claimed in claim 8, wherein changes in direction and/or course are carried out by defined standard curves at locations defined by an airfield traffic pattern at the selected landing site.

11. A method for safely landing an unmanned aerial vehicle, comprising:
    determining that all communication links of a multiplicity of communication links between the aerial vehicle and a ground control station, configured for controlling and/or monitoring the aerial vehicle, are interrupted;
    in response to determining that all communication links of the multiplicity of communication links are interrupted, selecting a suitable landing site based on stored data and in accordance with defined rules for landing site selection, wherein the stored data includes current flight conditions data and nearby landing sites data, and wherein the stored data and the defined rules for landing site selection are mirrored on the ground control station;
    determining a flight route to the selected landing site, wherein determination of the flight route is carried out according to defined rules for flight route determination, and wherein the defined rules for flight route determination are mirrored on the ground control station with the stored data and the defined rules for landing site selection and the ground control station is configured determine the same flight route and the same selected landing site as determined by the unmanned aerial vehicle in response to determining an interruption on all communication links of the multiplicity of communication links; and
    landing the aerial vehicle at the selected landing site.

12. The method as claimed in claim 11, further comprising:
    determining by the ground control station whether all the communication links of the multiplicity of communication links between the aerial vehicle and the ground control station are interrupted, and transmitting information about interruption to an air traffic control center.

13. The method as claimed in claim 12, wherein the air traffic control center also closes at least part of an available airspace and a suitable landing site for safe landing of the aerial vehicle; wherein the aerial vehicle selects an identical suitable landing site for landing, in accordance with rules defined by an air traffic control center.

14. A ground control station for controlling and/or monitoring at least one unmanned aerial vehicle, comprising:
    a communication system, configured for communicating with the unmanned aerial vehicle and for communicating with an air traffic control system, having a multiplicity of communication links; and
    a monitoring device, configured for monitoring the multiplicity of communication links of the ground control station with the aerial vehicle and the air traffic control system;
    wherein the monitoring device is configured to determine that all the communication links of the multiplicity of communication links between the ground control station and the aerial vehicle are interrupted, and in response to determining that all the communication links of the multiplicity of communication links between the ground control station and the aerial vehicle are interrupted, determine a predicted landing site for the aerial vehicle based on stored data and in accordance with defined rules for landing site selection and transmit the predicted landing site to the air traffic control system, wherein the stored data includes current flight conditions data and nearby landing sites data, and wherein the stored data and the defined rules for landing site selection are mirrored on the aerial vehicle; and wherein the monitoring device is configured for determining a flight route to the selected landing site, wherein the determination of the flight route is carried out according to defined rules for flight route determination, and wherein the defined rules for flight route determination are mirrored on aerial vehicle with the stored data and the defined rules for landing site selection and the aerial vehicle is configured determine the same flight route and the same selected landing site as determined by the monitoring device in response to determining an interruption on all communication links of the multiplicity of communication links.

* * * * *